United States Patent Office 3,373,077
Patented Mar. 12, 1968

3,373,077
SOLUBLE AND FUSIBLE, HEAT RESISTANT, CHELATE POLYMERS
John J. O'Connell, Waltham, Mass., assignor to Monsanto Research Corporation, St. Louis, Mo., a corporation of Delaware
No Drawing. Filed June 7, 1963, Ser. No. 286,196
22 Claims. (Cl. 161—198)

The present invention relates to organometallic polymers which are polymeric chelates of the type in which the coordinated metallic element is an integral part of the back bone and, more particularly, provides new and valuable polymeric chelates of certain bis-salicylaldehyde Schiff bases.

To be useful as laminating resins, polymers should have thermal stability, a high softening point, flexibility, and solubility. Chelate polymers which have been known hitherto are defective in these properties.

It is an object of this invention to prepare highly heat-resistant polymeric organometallic compounds.

Another object of this invention is the provision of chelate polymers soluble in available solvents and able to be cast from solution to form coherent films.

Still another object of the invention is the provision of laminating compositions and laminates wherein the laminating resin has a high softening point.

These and other objects will become evident from a consideration of the following specification and claims.

In accordance with this invention, organometallic polymers are prepared by condensing together a linked bis-o-hydroxyarylcarboxaldehyde, a mono-primary-amine, and an organometallic compound of a divalent, tetra-coordinating metal.

Broadly, the chelate polymers of this invention may be described as linked o-formimidoylarenolato metal (II) polymeric chelates.

By arenolates are meant the oxides produced by replacement of hydrogen with metal in the hydroxyl groups bonded to aromatic carbon atoms of the stated o-hydroxyarylcarboxaldehyde, producing the structure:

—O—M$_{II}$—O— where M$_{II}$ is divalent metal.

By a linked bis-o-hydroxyarylcarboxaldehyde is meant a compound in which a divalent radical interposing at least one element (such as oxy, —O—, or methylene, —CH$_2$—) joins two aromatic rings carrying a hydroxy and a carboxaldehyde substituent or their residues on adjacent (ortho-positioned) ring carbon atoms, as exemplified by 5,5'-methylenedisalicylaldehyde:

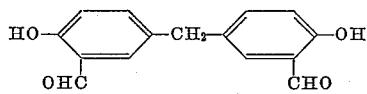

By an o-formimidoylarenol is meant the Schiff base of an o-hydroxyarylcarboxaldehyde with a mono-primary-amine such as

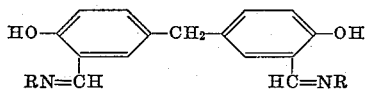

where R is an organic radical which is the residue of an mono-primary-amine. By a mono-primary-amine is meant an organic compound including a single NH$_2$ group attached to a carbonaceous radical.

In the polymers of the invention, the metal (II) atoms are chelated: that is, in addition to the covalent bonds of the metal to the phenolic hydroxyl group residues, the metal atoms are chelated by coordination bonds to the imino groups.

Thus, the presently provided chelate polymers consist essentially of repeating units of the formula

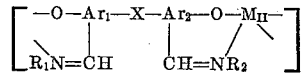

where X is a linking unit,

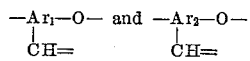

are o-hydroxyarylcarboxaldehyde residues, =NR$_1$ and =NR$_2$ are mono-primary-amine residues, and M$_{II}$ is a divalent, tetra-coordinated metal atom.

More particularly, the present invention provides high molecular weight polymers, containing at least about five repeating units consisting essentially of units of the above-stated formula.

Still more particularly, this invention provides cross-linked polymers comprising repetitive units of the above-stated structure.

In one embodiment of the invention as it comprises cross-linked chelate polymers, the polymers consist essentially of repetitive units of the formula

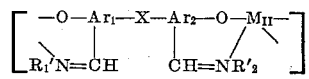

where each of R$_1$'N= and R$_2$'N= is separately selected from the residue of a mono-primary-amine and the residue of a di-primary-amine, provided that not more than about 1 in 4 of each R$_1$'N= and R$_2$'N= radical is the residue of a di-primary-amine. In the formula, —X—,

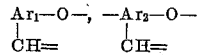

and M$_{II}$ are as defined above.

In a further embodiment of the invention, cross-linked polymers are provided comprising repetitive units of the formula (A)    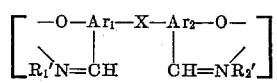

joined through metal atoms selected from divalent metal (II) atoms (—M$_{II}$—) and trivalent metal (III) atoms (—M$_{III}$—) in which the ratio of said divalent to said trivalent metal atoms is at least about 1:1, and X,

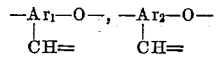

=NR$_1$' and =NR$_2$' are as defined hereinabove.

As will appear hereinafter, the polymers of the invention may include cross-linking produced by coordination bonds, as distinct from the covalent bonds in the types of cross-linking discussed above.

The presently provided polymers possess unusually advantageous properties for chelate polymers, including thermal stability, extensibility (mechanical toughness), and a high softening point.

A particularly unusual feature of the present high molecular weight polymeric chelates is solubility, which permits their use in applications such as solvent casting. With the stated properties, the polymers of this invention can advantageously be employed to prepare novel laminates having utility as materials of construction particularly for high temperature exposure.

Preparation of the present polymers is effected by condensing together a linked bis-o-hydroxyarylcarboxalde-hyde, a mono-primary-amine, and a compound of a divalent, tetra-coordinating metal. The condensation of the linked bis-o-hydroxyarylcarboxaldehyde with the mono-primary-amine may precede or follow its condensation with the metal (II) compound. Thus, a linked bis-o-hydroxyarylcarboxaldehyde may comprise a starting material in preparation of the present polymers.

THE STARTING MATERIALS

The aldehydes

Useful linked bis-o-hydroxyarylcarboxaldehydes are bis(o-hydroxy-aryl-carboxaldehydes) having a linking group between the aryl rings having the stated substituents. For the present purposes, to attain flexibility, the stated linking group will be divalent radical comprising at least one element. This may be a single divalent element, such as oxygen (—O—) and sulfur (—S—). It may be a single element bearing a substituent, such as a substituted nitrogen atom, like

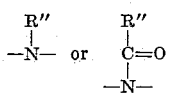

where R" is an organic radical, a sulfonyl group

a carbonyl group

or the like. It may be a series of elements, such as the azo group, —N=N—. The linking group may also be a hydrocarbon group. This may be aromatic, such as phenylene, methylphenylene, ethylphenylene, naphthylene, or a like divalent aromatic hydrocarbon radical, a cycloaliphatic radical such as, for example, a cyclohexylene group, an arylene alkylene radical, such as phenylene bis methylene (—CH$_2$—C$_6$H$_4$—CH$_2$—) or, most preferably, an alkylene group such as methylene, isopropylidene, hexamethylene, or the like. Combinations of such hydrocarbon radicals with the above-stated non-hydrocarbon linking groups may also be present, so that the linking group may be, for example, 4-azaheptamethylene (—CH$_2$CH$_2$CH$_2$NHCH$_2$CH$_2$CH$_2$—)

N-methyliminodimethylene (—CH$_2$N(CH$_3$)CH$_2$—), 2-acetamidoethylidene, oxydimethylene, and the like. Low molecular weight linking groups (molecular weight less than 100) and, particularly, low molecular groups interposing only a single element in a direct line between the salicylaldehyde rings which the linking groups join, such as methylene, sulfonyl, oxy, carbonyl and the like, are particularly preferred.

The stated linking groups join two o-hydroxyarylcarboxaldehyde radicals. The stated hydroxyarylcarboxaldehyde radicals will include a benzene ring on which the stated hydroxy and carboxaldehyde groups are carried by ortho-positioned benzene ring carbon atoms, providing a salicylaldehyde nucleus:

The stated salicylaldehyde ring may carry substituents, including one or more monovalent hydrocarbon substituents such as methyl, ethyl, isopropyl, tert-butyl, hexyl, cyclohexyl, phenyl, tolyl, benzyl, and the like. Also, two positions of the salicylaldehyde nucleus may be attached to a divalent hydrocarbon radical, such as a tetramethylene chain or a chain of carbon atoms including aromatic unsaturation between alternate carbon atoms, forming a fused ring system.

Thus, exemplary of the bis-salicyaldehydes useful in preparing the presently provided chelate polymers are 5,5'-methylenedisalicylaldehyde
5,5'-sulfonyldisalicylaldehyde
5-5'-methylenebis(4-phenylsalicylaldehyde)
5,5'-methylenebis(3-methylsalicylaldehyde)
4,4'-methylenedisalicylaldehyde
5,5'-oxydisalicylaldehyde
5,5'-iminodisalicylaldehyde
5,5'-isopropylidenedisalicylaldehyde
5,5'-(cyclohexylmethylidene)disalicylaldehyde
6,6'-methylenebis(2-hydroxy-1-naphthaldehyde)
5,5'-ethylidenebis(3,4-tetramethylenesalicylaldehyde)
and the like.

The amines

Referring to the mono-primary-amines useful in preparing the present polymers, these may comprise any of a wide variety of amines in which an organic radical is attached to an NH$_2$ primary amine group. To provide polymers with desirably low crystallinity and high solubility, it is found that mono-primary-amines employed in preparing the polymer should include aliphatic amines, either alone or combined with cyclic (aromatic and heterocyclic) primary amines; in the latter case, the ratio of aliphatic to cyclic amine may be down to a 1:2 molar ratio, and is preferably at least a 1.:1 molar ratio.

The organic radical of the stated primary amines may be a hydrocarbon radical, as in an aliphatic amine such as methylamine, ethylamine, propylamine, isopropylamine, butylamine, pentylamine, hexylamine, isooctylamine, dodecylamine, tetradecylamine, and the like. The useful amines may include those in which the stated organic radical is aromatic, in which the NH$_2$ is attached to an aromatic ring carbon atom, such as aniline, m-toluidine, 2,3-xylidine, mesidine, 1-naphthylamine, 3-biphenylamine, 4-biphenylamine, and the like. Also contemplated by this invention are aromatic-aliphatic amines such as benzylamine, phenethylamine, 1-naphthalenethylamine, 1-indanethylamine, and the like.

Moreover, the presently useful amines may include heterocyclic primary amines such as 2-furanamine, 2-p-dioxanamine, 3-γ-pyranylamine, furfurylamine, 2-aminopyrrole, 3-aminopyridine, and so forth.

In addition to the stated mono-primary amines with a hydrocarbon or heterocyclic radical attached to the —NH$_2$ group, the polymers of this invention can be prepared from primary amines wherein the stated organic hydrocarbon or heterocyclic radicals carry functional substituents. These may, for example, be substituents capable of chelating with the metal atoms included in the polymer chains of this invention, such as nitrile groups, tert-amino groups such as dimethylamino, diethylamino, dibutylamino, and so forth, or non-interfering groups such as sulfonyl or the like. Thus, for example, the mono-primary-amines may be 3-aminopropionitrile, 3-amino-2-methylpropionitrile, N,N-dimethylethylenediamine, N,N-dimethylhexamethylenediamine, and may include N,N-dimethylphenylenediamine, N,N - dipropylphenylenediamine, p-aminobenzonitrile, p-aminophenylacetonitrile, p-(p-amino-phenylsulfonyl)benzonitrile, (aminophenylsulfonyl)-N,N-dimethylaniline, and the like.

The linked bis(o-formimidoylarenols)

When the linked bis-o-hydroxyarylcarboxaldehyde and mono-primary-amine are precondensed in preparing the present polymers, the starting material for the polymer is a linked bis(o-formimidoylarenol). In referring to bis(o-formimidoylarenols) herein, what is means is the Schiff base prepared by condensation of two moles of a mono-primary-amine with one mole of the bis-o-hydroxyarylcarboxaldehyde of the above-stated nature, in which each of the aldehyde groups has been condensed with the mono amine to form a Schiff base, —N=C—, bond. Thus, for example, 4,4' - methylenebis[2 - (N - butylformimidoyl) phenol] is the nomenclature employed to describe the compound of the structure

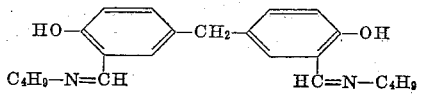

Thus, illustrative of presently useful linked bis-formimidoylarenols which may be included alone or in combination as stated above in preparation of the polymers of this invention are N-hydrocarbyl-substituted derivatives such as:

4,4'-methylenebis[2-(N-butylformimidoyl)phenol],
4,4'-methylenebis[2-(N-propylformimidoyl)phenol],
4,4'-methylenebis[2-(N-benzylformimidoyl)-phenol],
4,4'-methylenebis[2-(N-tolylformimidoyl)phenol],
4,4'-methylenebis[2-(N-xylylformimidoyl)phenol],
4,4'-isopropylidenebis[2-(N-butylformimidoyl)phenol],
4,4'-methylenebis[2-(N-butylformimidoyl)-5-methylphenol],
4,4'-ethylidenebis[2-(N-butylformimidoyl)-3-isopropylphenol],
4,4'-methylenebis[2-(N-butylformimidoyl)-5-phenylphenol],
4,4'-n-octylidenebis[2-(N-phenylformimidoyl)phenol],
4,4'-isopropylidenebis[2-(N-isobutylformimidoyl)phenol],
4,4'-methylenebis[2-(N-phenethylformimidoyl)phenol],
4,4'-methylenebis[2-(N-3-tolylpropylformimidoyl)phenol],
4,4'-oxybis[2-(N-butylformimidoyl)phenol],
5,5'-sulfonylbis[2-(N-butylformimidoyl)-phenol],
4,4'-sulfonylbis[2-(N-butylformimidoyl)-6-methylphenol],
4,4'-methyliminobis[2-(N-hexylformimidoyl)phenol],
4,4'-oxydimethylenebis[2-(N-isopropylformimidoyl)phenol],
3,3'-oxybis-[2-(N-butylformimidoyl)-1-naphthol],
6,6'-oxybis[2-(N-benzylformimidoyl)-2-naphthol],
4,4'-carbonylbis[2-(N-methylformimidoyl)-phenol],
4,4'-carbonylbis[2-(N-butylformimidoyl)phenol], and so forth.

Further illustrating the linked bis-o-formimidoylarenols useful (in conjunction with aliphatic-substituted formimidoyl linked bis-arenols) in preparing the present polymers are those including heterocyclic-substituted formimidoyl residues such as 4,4'-methylenebis[2-(N-3-pyridylformimidoyl)phenol],
4,4'-methylenebis[2-(N-2-pyrrolylformimidoyl)phenol],
4,4'-methylenebis[2-(N-5-methyl-3-pyridylformimidoyl)phenol],
4,4'-isopropylidenebis[2-(N-3-pyridylformimidoyl)phenol],
4,4'-methylenebis[2-(N-3-acridylformimidoyl)phenol],
4,4'-methylenebis[2-(N-3-quinolylformimidoyl)phenol],
4,4'-methylenebis[2-(N-2-furylformimidoyl)phenol],
4,4'-oxybis[2-(N-3-γ-pyranylformimidoyl)phenol],
4,4'-sulfonylbis[2-(N-3-pyridylformimidoyl)phenol],
4,4'-carbonylbis[2-(N-3-pyridylformimidoyl)phenol],
4,4'-oxybis[2-(N-3-pyridylformimidoyl)phenol],
4,4'-oxybis[2-(N-2-furylformimidoyl)-1-naphthol], and so forth.

Still further illustrative of the linked bis-formimidoyl arenols useful, alone or in combination, in preparing the present novel polymers are those wherein the organic radical attached to the mono-primary-amine residue carries non-interfering functional substituents such as:

4,4'-methylenebis[2-(N-p-cyanophenylformimidoyl)phenol],
4,4'-methylenebis[2-(N-p-dimethylaminophenylformimidoyl)phenol],
4,4'-benzylidenebis[2-(N-4-cyano-2-methylphenylformimidoyl)phenol],
4,4'-methylenebis[2-(N-3-cyanopropylformimidoyl)phenol],
4,4'-methylenebis[2-(N-3-cyano-2-methylpropylformimidoyy)phenol],
4,4'-methylenebis[2-(N-4-cyanophenylformimidoyl)-3-phenylphenol],
4,4'-methylenebis[2-(N-p-diethylaminophenylformimidoyl)-4-t-butylphenol],
4,4'-methylenebis[2-(N-4-cyano-3-pyridylformimidoyl)-phenol],
4,4'-methylenebis[2-(N-4-cyano-2-furylformimidoyl)phenol],
4,4'-methylenebis[2-(N-4-cyanophenylformimidoyl)-1-naphthol],
4,4'-oxybis[2-(N-p-dimethylaminophenylformimidoyl)phenol],
4,4'-sulfonylbis[2-(N-p-dimethylaminophenylformimidoyl)phenol],
4,4'-oxybis[2-(N-dimethylaminophenylformimidoyl)-3-methylphenol],
4,4'-carbonylbis[2-(N-p-dimethylaminophenylformimidoyl)phenol],
4,4'-carbonylbis[2-(N-p-cyanophenylformimidoyl)phenol],
4,4'-oxybis[2-(N-3-cyanopropylformimidoyl)phenol],
4,4'-oxybis[2-(N-p-dimethylsulfonamidophenylformimidoyl)phenol], and the like.

Mixtures such as the stated mixtures of linked bis-[o-(N - alkylformimidoyl)arenols and bis[o-(N-aryl- or heterocyclic formimidoyl)arenols] and mixed bis-formimidoylarenols such as 2-(N-butylformimidoyl)2'-(N-3-pyridylformimidoyl)-4,4'-methylenediphenol are also useful in the practice of this invention. Correspondingly, mixtures of linked bis(hydroxyarylcarboxaldehyde), mixtures of mono-primary-amines, and mixtures of both may be used in the preparation of the present polymers.

The metal (II) compounds

The metal (II) compounds which are reacted with the above-described bifunctional bidentate ligands to provide the present polymers are organometallic metal II compounds, by which are meant compounds of Periodic Table Group II divalent, tetra-coordinating metals, including Zn, Cd and Be, with organic radicals in which the metal atom is bonded to a carbon atom. Usually, dihydrocarbyl and especially dialkyl organometallic compounds are advantageous. Examples of presently useful dialkyl compounds are dipropyl beryllium (II), diethyl beryllium (II), dibutyl zinc (II), dipentyl zinc (II), diisopropyl beryllium (II), ethylmethyl zinc (II), dibutyl cadmium (II), diethyl cadimum (II), and so forth.

METHOD OF POLYMER FORMATION

Referring now to the procedure for preparation of polymers, in accordance with the present invention, comprising condensing together a linked bis(o-hydroxyarylcarboxaldehyde), a mono-primary-amine, and an organometallic compound of a divalent, tetra-coordinating metal, this condensation will usually be carried out in two steps. These steps may comprise the condensation of a linked bis(o-hydroxyarylcarboxaldehyde) with a mono-primary-amine to form a Schiff base, followed by condensation of the Schiff base with the organometallic metal (II) compound to form a polymer, as represented by the equations:

(1)
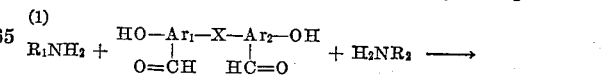

(2)
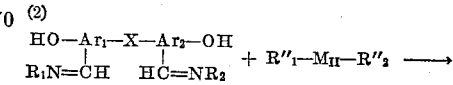

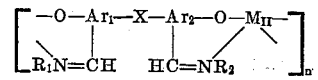

where $R_1N=$, $R_2N=$,

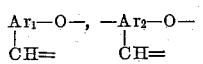

and X are as defined above, $R''_1-M_{II}-R''_2$ is an organometallic metal (II) compound in which $R''_1$ and $R''_2$ are each organic radicals bonded through a carbon atom to the metal atom, and $n$ is an integer representing the number of repeating units in the polymer produced. Formation of polymer with the stated repeating units can also be achieved by steps comprising condensing a linked bis(o-hydroxyarylcarboxaldehyde) with an organometallic metal (II) compound to form a polymeric condensate, which is thereafter condensed with a mono-primary-amine to form the ultimate chelate polymer structure, as represented by the equations:

(1)
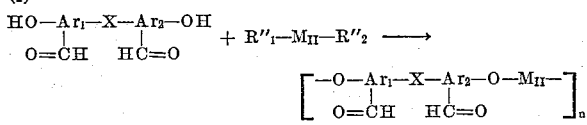

(2)
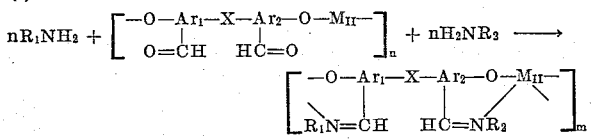

where $R_1N=$, $R_2N=$,

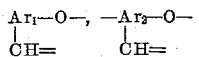

$M_{II}$, $R''_1$ and $R''_2$, X and $n$ are as defined above and $m$ is an integer representing the number of repeated units in the ultimate polymer.

In general, the preferred method of carrying out the stated double condensation is to prepare the Schiff base first and react it with the organometallic compound, as illustrated in the first set of equations above. Condensation of the arylcarboxaldehyde to form a Schiff base is readily effected by usual methods: contacting the aldehyde and amine and removing the water evolved by the condensation, by heating, for example, advantageously in a reaction medium comprising a solvent or diluent aiding in the water removal, such as an aromatic hydrocarbon like benzene which azetotropes with water.

In condensation of the organometallic metal (II) compound with the linked bis-hydroxyaryl compound (aldehyde or Schiff base) to produce polymer formation, the reactants will be contacted, as by mixing. Temperatures for effecting the condensation may be from above the freezing point of the mixture up to below the decomposition temperature of the reaction mixture components. Room temperature (about 20–25° C.) is effective and convenient.

Advantageously, the reaction will be conducted in a reaction medium comprising a solvent or diluent. Various organic solvents can be employed, which are inert in the reaction system. Organic solvents having a high dipole moment, at least above 2.5 Debuye units, are found advantageous; exemplary of these are nitriles like acetonitrile, sulfoxides like dimethylsulfoxide, and dialkylamides such as dimethylformamide and dimethylacetamide. Especially, and indeed unexpectedly, advantageous results are obtained using basic solvents, particularly tertiary amines. Exemplary of such amines are pyridine and quinoline, dimethylaniline, triethylamine, 1,4-diazabicyclo[2.2.2]octane, and the like. Heterocyclic tertiary amines having aromatic unsaturation like pyridine, quinoline and lutidine are particularly effective for the production of polymers which are of high molecular weight and possessing high softening points, coupled with solubility of the polymer adapting it for convenient application to substrates from solution.

The aryl compound and the metal compound react in a 1:1 molar ratio to form the polymer in the case of the presently discussed bifunctional bidentate ligand and metal (II) compound, and about the stoichiometric ratio has been found effective in producing the polymers of this invention. If desired, an excess of either component, preferably not more than a slight excess above the molar ratio of 1:1, can be employed.

During reaction of the organometallic metal (II) compound with the bis-hydroxyaryl compounds, for example, by contact in a solvent as above described, desirably, the reaction mixture is protected from moisture and air, for example, by conducting the reaction under a dry inert gas such as nitrogen or argon. Pressures may be atmospheric, superatmospheric such as up to about 5000 pounds per square inch gauge (p.s.i.g.), or subatmospheric, such as down to about 0.5 mm. Hg, but generally about atmospheric pressures are suitable. After heating has been continued until the condensation has proceeded to produce polymer formation, usual means may be employed to isolate the polymer, such as heating to drive off lower boiling reaction mixture components like solvent; if desired, the polymer may be maintained in solution for further utilization.

When the polymer has been formed in accordance with this invention from a linked bis(o-hydroxyarylcarboxaldehyde) and an organometallic metal (II) compound, it is thereafter converted to the Schiff base polymer by condensation of the aldehyde groups with a mono-primary-amine. At least about 2 moles of the amine per reacting unit in the polymer (comprising 2 aldehyde groups) will be introduced into the reaction mixture, and an excess can be used, if desired, such as up to 10 moles per unit. The soluble polymers provided in accordance with the present invention react readily to form the Schiff bases upon being contacted with the stated amines while the water produced by the condensation reaction is removed. For example, the reactants may be heated to drive off the water, advantageously in a reaction medium comprising a solvent in which preparation of the polymer was effected, such as pyridine. Reaction is continued until the polymer is substantially free of unreacted aldehyde groups to produce the Schiff base polymers of the invention.

CROSS-LINKED POLYMER

When preparation of a chelate polymer is effected by condensing together reactants consisting of an organometallic compound with a linked bis(formimidoylarenol) in accordance with this invention, the products obtained are apparently linear polymers of moderate molecular weight. The linearity is evidenced by moderate softening temperatures, in the range of below 300° C. To raise the softening point and to increase the molecular weight, the polymer may be modified as set forth hereinafter.

*Secondary coordination cross-links*

As indicated above, the residue of the mono-primary-amines in the present polymers may include functional groups which coordinate metal atoms, such as cyano and tertiary amine groups. Strong secondary coordination bonds formed by the metal atoms in the polymer chain with such coordinating groups form cross links between polymer chains, as illustrated, for example, by a polymer structure such as

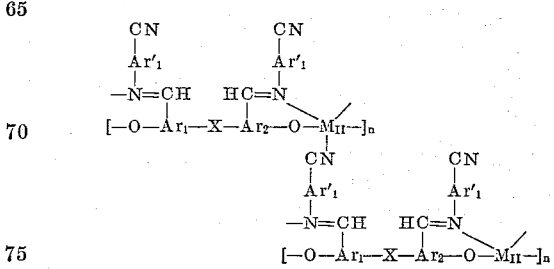

where

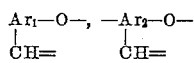

X, $M_{II}$ and $n$ are as defined above, and $Ar'_1$ is a bivalent hydrocarbon residue, such as phenylene. Thus, in accordance with this invention, a cross-linked Schiff base polymer may be produced by employing a mono-primary-amine having a coordinating group as a substituent of the residue of the stated amine. Preferably, such polymers are prepared to comprise residues of a hydrocarbyl amine and of an amine comprising, additionally, a coordinating group as substituent. For example, a mixture of a linked bis-hydroxyarylcarboxaldehyde Schiff base with a hydrocarbyl primary amine and a Schiff base of such an aldehyde with an amine having a coordinating group in the residue of the amine can be used to prepare the polymers. This is advantageous in providing polymers with greater flexibility and extensibility than those in which each and every amine Schiff base residue is capable of cross-linking the polymer chains by a coordination bond.

Polyamine cross-links

As a further method of providing a cross-linked polymer in accordance with the invention, the polymer prepared by condensation of a metal (II) compound, a linked bis-hydroxyarylcarboxaldehyde and a mono-primary-amine in accordance with this invention is heated with a low proportion of a diamine. Some of the mono-amine residues in the polymer are thus displaced by residues of the diamines, producing cross-linking between chains. The process may be represented by the equation:

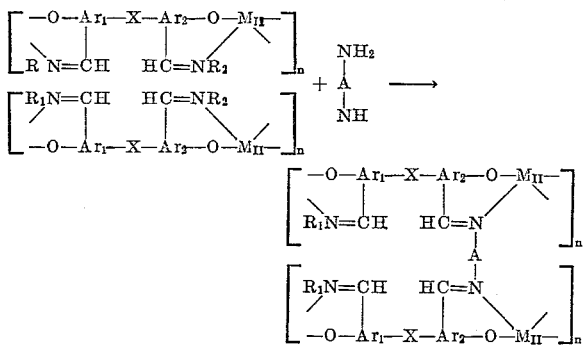

where $R_1N=$, $R_2N=$,

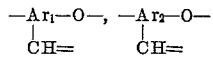

$M_{II}$ and $n$ are as defined above, and A is a bivalent radical which is the residue of a di-primary-amine.

If a high proportion of a diamine is used, sufficient to displace more than, say, about up to half the mono-amine residues, the polymer obtained will be highly cross-linked and insoluble, which is an undesirable defect of previously known chelate polymers. Accordingly, in accordance with this invention, the amount of diamine employed will be a proportion such as to provide not more than 1 amine group (½ of a diamine molecule) for each bis imine residue (containing 2 imino nitrogen atoms) in the chelate polymer. Preferably, the proportion is less than this, and, indeed, preferably not more than about ¼ amino nitrogen atom will be provided by the polyamine cross-linking agent for each bis imine residue in the chelate polymer being treated.

The polyamines which can be employed in the present connection will contain at least two primary amino groups. They may be aliphatic or aromatic; when they are aromatic polyamines, to avoid detracting from polymer solubility, low proportions should be used, or the aromatic polyamines mixed with aliphatic polyamines. Exemplary of those which may be employed are the alkylene diamines such as putrescine and cadaverine, ethylene diamine, hexamethylene diamine, 1,2-propanediamine, 1,3-propanediamine, 1,2-butanediamine, and also polyamines containing recurring amine groups in the chain such as 4-methyldiethylenetriamine. Also useful as cross-linking agents are the aromatic polyamines such as o-phenylenediamine, 1,4 - naphthalenediamine, 3,3' - biphenyldiamine, 3,4 - biphenyldiamine, and so forth. The amino-substituted nitrogen-containing heterocyclics such as 2,6-diaminopyridine and 2,5-diamino-1,3,4-thiadiazole are also contemplated. Particularly preferred are the alkylene diamines and, especially, hexamethylene diamine.

Trivalent metal cross-links

In another embodiment of this invention, the chelate polymer is prepared in a fashion such that it includes trivalent metal covalent bonds to effect cross-linking.

From organometallic metal (III) compounds

A first method of making the presently provided chelate polymers comprising such trivalent metal cross-linking bonds comprises condensation of a bis-hydroxyarylcarboxaldehyde and a mono-primary-amine, of the above-stated description, with a mixture of an organometallic metal (II) compound and an organometallic metal (III) compound. The stated organometallic compounds will usually be hydrocarbyl and, generally, alkyl metal compounds of the metal (II) and the metal (III). Thus, useful organometallic metal (III) compounds for production of the cross-linked polymers of this invention by polymer formation from a mixture of metal (II) and metal (III) compounds may be organometallic compounds of Group III–B metals, including aluminum compounds such as tributyl aluminum, triethyl aluminum, trihexyl aluminum, triisobutyl aluminum, trimethyl aluminum, tripropyl aluminum, tris(2-ethylhexyl)aluminum, and the like. Similarly, there may be employed trisubstituted gallium compounds such as triethyl gallium, trimethyl gallium and triphenyl gallium, and organoindium compounds such as trimethyl indium.

The polymers comprising the stated trivalent metal atoms are provided by condensing together the linked bis-hydroxyarylcarboxaldehyde, mono-primary-amine, organometallic metal (II) compound, and organometallic metal (III) compound. Generally, to avoid possible hydrolysis of the polymer bonds by water released in condensation of CHO groups with primary amine groups to form a Schiff base, the organometallic compounds are preferably condensed with the preformed Schiff base; that is, the linked bis(formimidoylarenol). The condensation of the organometallic compounds with the Schiff base is effected under conditions substantially as described above in connection with formation of the chelate polymers from the organometallic metal (II) compounds. The reactants will be heated together to effect the condensation, preferably in an ionizing solvent of fairly high dielectric constant, desirably a base like pyridine. Maintaining the reaction mixture under an atmosphere of a dry inert gas is necessary, but while pressure may be varied to above and below atmospheric, usual atmospheric pressures are generally suitable. The total number of moles of organometallic compound consumed per mole of bis(formimidoylarenol) in polymer formation depends on how much of the organometallic compound used is divalent metal (II) and how much is trivalent metal (III) compound. It will amount to a number of moles of metal (II) compound equal to:

1⅔ (number of moles of metal (III) compound)

plus a number of moles of metal (III) compound equal to:

⅔ (number of moles of metal (II) compound)

That is, 1 mole of metal (II) compound, plus ⅔ mole of metal (III) compound, is the equivalent of 2 moles of the bis(formimidoylarenol), and if more or less than 1 mole of the metal (II) compound is used, proportionally less or more than ⅓ mole of the metal (II) compound will be needed in the ratio of ⅔ mole of the latter for each mole of the former. As will appear in the examples hereinafter, an excess of one of the reactants may be used in preparing the polymers, if desired. For example, a slight excess of organometallic reactants may be introduced to insure production of polymer with metallic end groups and substantially free of phenolic OH groups. The molar ratio of metal (II) compound to metal (III) compound in the total amount of organometallic reactant used, to avoid unduly extensive cross-linking conducive to brittleness of the polymer, will be at least about 1:1, and preferably between about 5:1 and 10:1; it may be higher, such as up to about 20:1. It has been found advantageous in some preparations to introduce part of the metal (II) compound, then introduce the metal (III) compound and, finally, add the rest of the metal (II) compound to the reaction mixture; but the order of addition is not critical.

*From arenolato metal (III) compound*

In an alternative procedure, a tris(formimidoylarenolato) metal (III) compound having a formimidoylhydroxyaryl radical linked to each formimidoylarenolato radical is made by condensing a metal (III) compound with a linked bis(formimidoylarenol), for example, as illustrated by the equation (A)

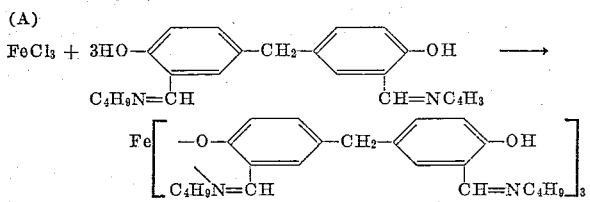

This is, in turn, condensed with a metal (II) compound and a linked bis(formimidoylphenol) to form a polymer with cross-linking resulting from metal (III) bonds, as illustrated by the equation (B)

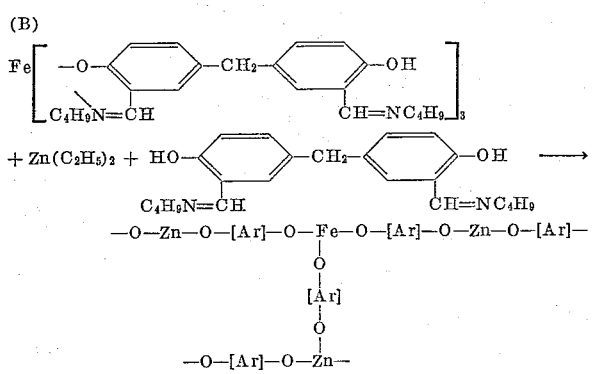

and so forth, where [Ar] here represents the

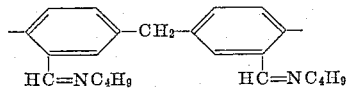

radical, and the fragment of the polymer molecule illustrated is exemplary of the cross-linked polymer structure including multiple —O—[Ar]—O— repeating units joined by —Fe— and —Zn— repeating units.

As will be appreciated from the above discussion, the stated procedure may also be conducted using the corresponding arylcarboxaldehydes, with subsequent conversion of the aldehyde groups to formimidoyl groups by reaction with primary amines.

As will be evident from the above equations, the polymer resulting from the stated procedure contains the same kind of repetitive units, including divalent and trivalent metal covalent bonds, as the polymer made from organometallic metal (II) and metal (III) compounds. Indeed, the presently provided type of chelate polymer including only metal (II) can be made similarly using, for example, a bis(arenolato) metal (II) compound with hydroxyaryl radicals linked to each arenolato radical to form a polymer by condensation with an organometallic compound, although this is usually less convenient than the previously described method.

In preparation of polymers from a tris(arenolate) as illustrated by the above equations, as in the above-described synthesis of the present polymers from an organometallic Group III–B metal (III) compound, the hydroxyarylcarboxaldehydes and mono-primary-amines useful in preparation of the Schiff bases employed for the polymer formation are of the type discussed hereinabove.

The metals in the tris(arenolates) used to prepare the stated polymers will have a principal valence of 3 and be hexa-coordinating, including, for example, iron (III) and chromium (III), as well as the Group III–B metals, like aluminum. Formation of the tris(arenolate) of such metals with the useful linked bis-hydroxyaryl compounds is effected by means usual in the art for synthesis of metal arenolates. For example, a simple metal salt such as ferric chloride, ferric bromide, chromium sulfate, chromium oxalate, ferric acetate, or the like, is heated with the hydroxy compound in solution under conditions effective to remove condensation products such as HCl, such as heating to neutralize HCl with a base such as NaOH, at temperatures such as between 50° C. and 100° C. Selective extraction may be used to isolate the desired tris-arenolate from the resulting reaction product.

Illustrative of the tris(formimidoylarenolates) which may be employed for polymer formation in accordance with this aspect of the present invention, preparable as above stated, are tris-(4-[4-hydroxy-3-(N-butylformimidoyl)benzyl]-2-(N-butylformimidoyl)phenolato)iron, tris(4-[4-hydroxy-3-(N-butylformimidoyl)phenoxyl]-2-(N-butylformimidoyl)phenolato)iron, tris(4-[4-hydroxy-3-(N-butylformimidoyl)benzyl]-2-(N-butylformimidoyl)phenolato)chromium, and the like.

To prepare the polymer, the tris(hydroxyaryl-substituted-arenolato) metal (III) compound is combined with an organometallic metal (II) compound. The latter will be an organometallic metal (II) compound of the type described hereinabove, such as diethyl zinc. Proportions of the reactants entering into the structure of the resulting polymer may vary. Condensation of the linked bis-arenol compound with the metal (II) compound forms linear chains, consuming these reactants in a 1:1 molar ratio. Metal (II) compound must be provided in excess of that consumed by the linear chain-forming reaction, to condense with the unesterified OH groups in the tris-(arenolate) and introduce metal (III) cross-linking by such condensation. In providing for this, an extra 1.5 moles of organometallic metal (II) compound will be consumed per mole of metal (III) tris(arenolate) used, over and above the stated one mole per mole of linked bis-arenol compound. Variation in the proportion of linked bis-arenol compound to tris(arenolate) will control the extent of cross-linking produced: this may be as low as a 1:1 molar ratio, and range up to, say, about 20:1, but will usually be between a 5:1 and a 10:1 molar ratio. In conducting the polymerization, departure can be made from the stoichiometric ratios in the reaction mixture, if desired.

Conditions for the polymerization comprise heating the tris(arenolate), the metal (II) compound, and the linked bis-arenol compound together to effect condensation of the metal (II) compound with the phenolic OH groups of the other reactants. The condensation is like that occurring in the above-discussed polymerizations wherein an organometallic metal (II) compound is condensed with a hydroxyaryl compound, and conditions effective to produce the desired polymer are substantially as set out above in connection with such above-discussed polymerizations. The reaction mixture will advantageously include a solvent like pyridine, and the reaction mixture may be heated to effect the condensation, with removal of the condensation by-products, to produce high molecular weight polymers characterized by repetitive units as described above.

Laminate formation

Proceeding now to a consideration of formation of composite products with the presently provide chelate polymers, the present polymers are especially useful as laminating resins for sheets of glass fabric or as a reinforcement material for glass filament which is wound spirally into a cylindrical shape. The laminated sheets of glass fabric have especial use as radomes for aircraft. Some advantages of the present invention reside in the fact that presently provided soluble chelate polymer solutions are sufficiently low in viscosity to permit application to sheets of glass fabric and removal of solvent to effect lamination.

The polymers of the invention are film-forming and can be applied to coat sheets of glass fabric by dipping the sheets in solutions of the polymer and then removing most of the solvent, as by evaporation, providing a coating which is above 95% by weight solids, for example. When the coated sheets are placed in face-to-face contact and permitted to remain in this position while residual solvent is driven off, they are adhered by the resin to form a unitary structure.

The present polymers can also be used as adhesives for joining surfaces such as metal to metal, wood to wood, paper to paper, or dissimilar materials; potting compositions for use in the construction of magnet coils or electronic assemblies; or wire insulation, and so forth.

The invention is illustrated, but not limited, by the following examples.

EXAMPLE 1

This example describes preparation of methylenebis-(o-formimidoylphenols).

(a) A mixture of 250 milliliters (ml.) of anhydrous benzene and 12.8 grams (g.) (0.05 mole) of 5,5'-methylenedisalicylaldehyde is heated to reflux while 7.3 g. (0.01 mole) of n-butylamine is added slowly. The mixture is refluxed until the stoichiometric amount of water has been collected by azeotropic distillation and then allowed to continue refluxing for 1 hour. Now, 200 ml. of the solvent is removed by distillation and the remaining reaction mixture is cooled to room temperature. Addition of 500 ml. of petroleum ether to the reaction mixture is followed by cooling to −50° C., producing precipitation of the 5,5'-methylenedisalicylaldehyde Schiff base with n-butylamine, 4,4'-methylenebis[2-(N-butylformimidoyl)phenol]. After two recrystallizations from petroleum ether and decolorization with activated charcoal, followed by drying under vacuum, the methylene bis[2-(N-butylformimidoyl)-phenol] is obtained as a yellow powder melting at 36° C.

(b) Following the same procedure, addition of 16.4 g. (0.12 mole) of N,N-dimethyl-p-phenylenediamine to a benzene solution of 12.8 g. of methylenedisalicylaldehyde produces a Schiff base which can be recrystallized from 2-butanone. After drying at 100° C. under vacuum for three hours, the 4,4'-methylenebis[2-(N-p-dimethylaminophenylformimidoyl)phenol] is obtained as a bright orange powder melting at 226° C.

(c) Preparation of the Schiff base with 3-aminopyridine is conducted analogously to provide 4,4'-methylenebis-[2-(N-3-pyridylformimidoyl)phenol], M. 214° C., percent N calculated, 13.7%; found, 13.9%.

(d) The Schiff base with 4-aminobenzonitrile is prepared by the same procedure stated above, providing 4,4'-methylenebis[2 - (N-[4-cyanophenyl]formimidoyl)phenol], of the formula

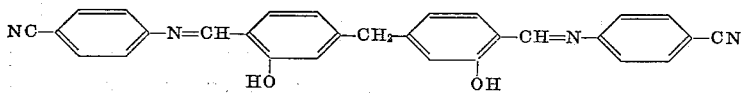

M. 235° C., percent N calculated, 12.3%; found, 12.5%.

(e) The aniline Schiff base is prepared by reacting aniline with methylenedisalicylaldehyde in ethanol, following the procedure described above. The product is 4,4'-methylenebis[2-(N-phenylformimidoyl)phenol], M. 145° C., percent N calculated, 6.7%; found, 6.8%.

(f) Addition of 2.2 g. (0.022 mole) of benzylamine to a solution of 2.5 g. (0.01 mole) of methylenedisalicylaldehyde in 100 ml. of dry ethanol is followed by heating at reflux for 10 minutes. The reaction mixture is cooled to room temperature, and the precipitate is collected by filtration. The crude solid product is recrystallized from acetone to provide 4,4'-methylenebis[2-(N-benzylformimidoyl)phenol] as a yellow crystalline powder, M. 137° C.

EXAMPLE 2

This example describes preparation of a linked disalicylaldehyde.

4,4'-isopropylidenedisalicyclic acid is prepared by a Kolbe-Schmitt reaction. The disodium salt of 4,4'-isopropylidenediphenol is prepared by refluxing 4,4'-isopropylidenediphenol with the theoretical amount of NaOH as pellets in ethanol combined with a diphenyl/diphenyl ether mixture. Refluxing is continued until the NaOH has reacted, and the resulting water is stripped off with the ethanol. The residual slurry is refluxed at 3–5 mm. until all water is removed. The resulting slurry contains 1.83 moles of the disodium salt, in a concentration of one mole per 600 ml. of the diphenyl/diphenyl ether liquid medium. This slurry is charged into a 2-gallon autoclave which is flushed several times with carbon dioxide and then pressurized with $CO_2$ to 700 p.s.i.g. (cylinder pressure), and heated at 200° C. for 6 hours (maximum pressure 1100 p.s.i.g.). The vessel is cooled to room temperature and the slurry filtered and the solids washed with benzene. They are then dissolved in warm water, the solution is filtered, and the filtrates are acidified with concentrated HCl to provide the desired acid as a precipitate. After boiling and washing with water, the neutral equivalent of the 4,4'-isopropylidenedisalicylic acid is about 163.

To provide the disalicylaldehyde, a solution of 5.9 g. (0.19 mole) of the 4,4'-isopropylidenedisalicyclic acid in tetrahydrofuran is added to a solution of 3.6 g. (0.94 mole) of lithium aluminum hydride in 250 ml. of anhydrous tetrahydrofuran, at a rate such that the temperature does not exceed 60° C. After completion of the addition, the reaction mixture is held at 50° C., with stirring, for 2 hours and is then refluxed for ½ hour. It is cooled to room temperature, 10 ml. of water is added to destroy excess hydride, and the mixture is stirred at room temperature for 10 minutes, after which there is added 20 ml. of 10% by weight sulfuric acid. The precipitate that forms is removed by filtration and the filtrate evaporated down to a small volume. The solid separating on evaporation of the filtrate is collected by filtration and dried at 100° C. under vacuum. This gives 4.3 g. of product, free of carbonyl infrared absorption. This product is slowly added to a slurry of 6.6 g. (0.15 mole) of lead tetraacetate in 50 ml. of dry benzene at 60° C. After completion of the addition, the reaction mixture is refluxed with stirring for 2 hours and then cooled to room temperature. The precipitated lead acetate is removed by filtration, and then the benzene solution evaporated to dryness to provide 4.1 g. of brown solid which is dried at 100° C. under vacuum for 2 hours and then extracted with chloroform. The extracted product is 4,4'-isopropylidenedisalicylaldehyde, M. 147° C. It has a positive aldehyde test with 2,4-dinitrophenylhydrazine, and has the infrared spectrum characteristic of disalicylaldehydes.

Following a procedure as described in Example 1, this alkylidenedisalcylaldehyde is similarly converted to the Schiff base with monoamines such as butylamine, aniline, and the like.

EXAMPLE 3

This example describes preparation of a linear chelate polymer in accordance with the present invention, from a di-(salicylaldehyde), a dialkyl metal (II), and a monoamine.

A 25% by weight solution of diethyl zinc in heptane (0.052 mole of diethyl zinc) is slowly added, in an amount of 30 ml., to a rapidly stirred solution of 12.8 g. (0.05 mole) of methylenedisalicylaldehyde in 250 ml. of anhydrous pyridine, maintained under a nitrogen atmosphere. After completion of the addition, the reaction mixture is stirred at room temperature for ½ hour and then about three quarters of the pyridine is removed by distillation.

Now, 10 ml. of anhydrous n-butylamine is added to the reaction mixture, which is then heated to 110° C. for ½ hour. The remaining solvent is now removed by evaporation at 125° C. under vacuum, leaving the methylenebis[2-(N-butylformimidoyl)phenolato]zinc polymer as a brown, translucent resin which softens at about 240° C.

EXAMPLE 4

This example describes an alternative method for preparation of the methylenebis[2-(N-butylformimidoyl)phenolato]zinc polymer, employing the pre-formed methylenebis[2-(N-butylformimidoyl)phenol] as starting material.

A solution of 20 g. (0.055 mole) of methylenebis[2-(N-butylformimidoyl)phenol], prepared as described in Example 1, in 300 ml. of anhydrous pyridine is rapidly stirred in a nitrogen atmosphere and held at 70° C. while 33.8 ml. of a 25% solution of diethyl zinc in heptane (0.056 mole of diethyl zinc) is added, over a period of 25 minutes. The reaction mixture is heated at 110° C. for ½ hour, then about half the solvent is removed by distillation and the remaining solvent is removed from the resulting polymer solution by evaporation at 150° C. in vacuum. Percent N calculated for infinite polymer, 15.2%; found, 14.8%. The softening point of this polymer is about 240° C.

EXAMPLE 5

This example describes another preparation of the linear methylenebis[2 - (N - butylformimidoyl)phenolato]zinc polymer, using a different solvent.

A mixture of 5.1 g. (0.014 mole) of 4,4'-methylenebis [2-(N-butylformimidoyl)phenol] and 70 ml. of dry N,N-dimethylformamide is heated under nitrogen to 266° F. for ½ hour, and then cooled to 70° C. Now, 1.5 ml. (0.014 mole) of diethyl zinc is added, over a 5-minute period, and after the addition is complete the reaction mixture is maintained at 110° C. for an hour. Solvent is removed, about the first four-fifths by distillation, and the remainder by evaporation under vacuum at 150° C. The resulting resinous chelate polymer is dissolved in pyridine and the viscosity measured to determine the relative molecular weight, in equipment in which the efflux time of pyridine alone is 100 seconds. The dimethylformamide solvent system gives polymer for which a 2% solution in pyridine exhibits an efflux time of 124 seconds.

EXAMPLE 6

This example describes preparation of linear chelate polymers in still other solvents.

Using conditions as described in the preceding example, polymers are prepared using N,N-dimethylacetamide and using dimethylsulfoxide as solvents. The resulting methylenebis - [2 - (N-butylformimidoyl)phenolato]zinc chelate polymers as 2% solutions in pyridine have an efflux time, respectively, of 121 and 134 seconds.

When acetonitrile is employed as the solvent, employing conditions as stated above, but heating to the reflux temperature of acetonitrile initially and during the heating of the reaction mixture subsequent to addition of the dialkyl zinc, polymers are obtained having an efflux time for a 2% solution in pyridine which is 144 seconds.

Following the same procedure, the polymer is prepared from methylenebis-[2-butylformimidoyl)phenol] and diethyl zinc in mixtures of acetonitrile and pyridine. The ratios of the solvents in the mixtures and viscosities of the resulting polymers are shown in the following table.

| Ratio of acetonitrile [1] to pyridine | Viscosity [2] |
|---|---|
| 1:2 | 159 |
| 2:1 | 154 |
| 2.5:1 | 192 |
| 3:1 | 181 |
| 4:1 | 185 |
| 5:1 | 161 |
| 10:1 | 144 |

[1] By volume.
[2] Viscosity is given as the efflux time of a 2% solution of the polymer in pyridine. Efflux time of pyridine alone, 100 sec.

The polymer prepared with a 2.5-to-1 ratio of acetonitrile to pyridine, when made up into a 2% solution in pyridine, has a 9% higher viscosity than similar polymers prepared in pyridine alone (176 seconds).

EXAMPLE 7

This example describes preparation of the linear polymer at different reaction temperatures.

A mixture of 5.1 g. (0.0114 mole) of methylenebis [2-(N-butylformimidoyl)phenol] and 100 ml. of pyridine is maintained under a dry argon atmosphere while the solution is heated to reflux. Now 30 ml. of the pyridine solvent is removed by distillation, and the solution is brought to reaction temperature, whereupon 1.5 ml. (0.014 mole) of diethyl zinc in 10 ml. of anhydrous pyridine is introduced. After the addition is complete, the reaction mixture is allowed to reflux for an hour. Solvent is removed from the resulting solution of the polymer by distillation and subsequent evaporation under vacuum, and the relative molecular weight is measured by viscosity.

With reaction temperatures of 40° C. and 100° C. for the temperature of addition of the zinc reactant, the polymeric products obtained are in generally the same molecular weight range.

EXAMPLE 8

This example describes the preparation of chelate polymers using different amines in the Schiff base monomer.

A solution of 2.4 g. (0.005 mole) of 4,4'-methylenebis-[2 - (N-p-dimethylaminophenylformimidoyl)phenol] in 100 ml. of anhydrous pyridine is rapidly stirred in a nitrogen atmosphere while 3 ml. of 25% solution of diethyl zinc (about 0.005 mole of diethyl zinc) in heptane is added over a period of about 5 minutes. The reaction mixture is then stirred at room temperature for ½ hour, and then somewhat more than half of the pyridine solvent is distilled off, and the remaining solvent removed by evaporation at 125° C. The resulting clear brown resin is further dried at 150° C. under vacuum for 4 hours. The softening point of this resin is above 400° C.

When the zinc chelate polymer is prepared, proceeding similarly, from methylenebis[2 - (N - 3-pyridylformimidoyl)phenol] or from methylenebis[2-(N-4-cyanophenylformimidoyl)phenol], the resulting products are yellow polymers which also do not soften at up to 400° C.

EXAMPLE 9

This example describes preparation of another linear chelate polymer.

*Method A.*—A solution of 4.3 g. (0.01 mole) of methylenebis[2-(N-benzylformimidoyl)phenol] in 350 ml. of anhydrous pyridine is maintained at 70° C. in an argon atmosphere while 1.1 ml. (0.01 mole) of diethyl zinc in 50 ml. of anhydrous pyridine is added. The reaction mixture is then stirred at 70° C. for a half hour, and heated at reflux for one hour. Most of the pyridine is removed by distillation, and the remainder by heating under vacuum at 150° C. The resulting clear brown resin melts at 379° C.

*Method B.*—Proceeding similarly, but employing only 150 ml. of pyridine in the initial solution, the resulting resin is a yellow product which does not melt or soften up to 400° C.

The infrared spectra of the polymers produced by methods A and B are essentially identical.

EXAMPLE 10

This example describes the preparation of linear chelate polymers in which mixtures of bis(2-formimidoylphenol) starting materials are condensed with diethyl zinc.

A solution of 27.5 g. (0.075 mole) of methylenebis-[2 - (N-butylformimidoyl)phenol] and 10.2 g. (0.0025 mole) of methylenebis[2 - (N - 3 - pyridylformimidoyl)phenol] in 200 ml. of anhydrous pyridine is maintained at 100° C. under a nitrogen atmosphere while 1.23 g. (0.01 mole) of diethyl zinc is added over a period of about 5 minutes. The reaction mixture is then heated and stirred for one-half hour, and the solution is concentrated to about 10% solids, after which it is placed under vacuum at 80° C. for 1 hour and finally heated to 150° C. under vacuum. With this 3:1 molar ratio of the butylamine and aminopyridine Schiff bases, the resulting resin has a melting point of 260° C.

Employing the same conditions, but a 4:1 ratio of the butylamine to aminopyridine Schiff base monomers, the melting point of the resulting resin is 240° C. At a butyl: pyridyl ratio of 2:1, the resin melting point is 300° C., and at a 1:1 molar ratio, the melting point is 320° C. At a 2:3 molar ratio, the resin remains unsoftened up to 400° C.

EXAMPLE 11

This example describes preparation of cross-linked polymers in accordance with the invention employing diamines as cross-linking agents.

A series of samples of the linear chelate zinc polymers is prepared by addition of 66 ml. of 23% solution of diethyl zinc in heptane (0.014 mole of diethyl zinc) to a rapidly stirred solution of 25.6 g. (0.1 mole) of methylenedisalicylaldehyde in 500 ml. of anhydrous pyridine. The reaction is allowed to stir at room temperature for one-half hour; at this time, 150 ml. of pyridine is removed by distillation, 10 ml. of n-butylamine added, and the reaction mixture heated at reflux for one-half hour.

To a first series of such polymer solutions, at room temperature, amounts of ethylenediamine are added which vary between 1 and 10 percent by weight of the methylenedisalicylaldehyde used in preparing the resin.

To a second series of the linear polymer solutions, there are added amounts of methylenedianiline ranging between 1% and 15% by weight of the weight of the methylenedisalicylaldehyde employed in preparing the polymer.

The series of mixtures of the linear chelate polymers with the stated diamines are stirred at room temperatures for one-half hour, and then the pyridine is removed, by distillation and evaporation, leaving cross-linked polymer as residue. Softening points of these resins are determined, and it is found that resins which are infusible at 400° C. are obtained at 2-3 weight percent and higher concentrations of ethylenediamine, and at 9–11 weight percent and higher concentrations of methylenedianiline.

EXAMPLE 12

This example describes another preparation of a cross-linked chelate polymer in accordance with the invention, this being one wherein the N-butyl homopolymer is cross-linked with hexamethylenediamine.

The procedure used to prepare the methylenebis[2-(N-butylformimidoyl)phenol]zinc polymer is as described above in Example 4, but using liquid diethyl zinc instead of the heptane solution of the organometallic.

For each of the following preparations, the selected quantity of hexamethylenediamine is added to a solution of 5 grams of the methylenebis[2-(N-butylformimidoyl) phenolato]zinc polymer dissolved in 50 ml. of pyridine, followed by refluxing the resulting reaction mixture for one-half hour. The hot viscous solution is then cooled to 70° C. and the solvent removed by heating in a vacuum oven, and then the sample is finally heated to 150° F. under vacuum for 4 hours. The results are shown in the following table.

CROSSLINKING WITH HEXAMETHYLENE-DIAMINE

| Percent cross-linking agent (by weight of ligand): | Softening point, ° C. |
|---|---|
| 0 | 190–195 |
| 2 | 190–210 |
| 5 | 268–280 |
| 7.5 | >370 |
| 10 | >370 |
| 20 | >370 |

EXAMPLE 13

This example illustrates preparation of chelate polymers including a trivalent metal in the polymer chain.

A solution of 10 g. (0.0273 mole) of methylenebis-[2-(N-butylformimidoyl)phenol] in 250 ml. of dry pyridine is held at 90° C. under a nitrogen atmosphere while 1.69 g. (0.0137 mole) of diethyl zinc is added over a 5-minute period. The reaction mixture is stirred at 90° C. for one-half hour and then 0.45 g. (0.0023 mole) of tributyl aluminum as a 25% solution in heptane (2.3 ml.) is added to the reaction mixture. The resulting mixture is stirred at reflux temperature for an hour, then cooled to 32° C., then 1.2 g. (0.010 mole) of diethyl zinc is added, and the reaction mixture is stirred at 32° C. for 15 minutes, and then refluxed for another hour. Finally, the mixture is cooled to room temperature is cooled to room temperature, providing a clear viscous solution of resin. Drying in a vacuum oven at 110° C./10 mm. Hg for 4 hours produces a clear brown resin that softens above 370° C.

EXAMPLE 14

This example describes the preparation of the zinc aluminum polymer in a different solvent.

A solution is prepared in which 5.1 g. (0.014 mole) of methylenebis[2-(N-butylformimidoyl)phenol] is dissolved in 70 ml. of dry quinoline. This solution is heated to 90° C. under a nitrogen atmosphere, while 1.5 g. (0.012 mole) of diethyl zinc is added. The reaction mixture is stirred at 90° C. for an hour, and then 0.45 g. (0.0023 mole) of tributyl aluminum is introduced as a 25% solution in heptane (2.3 ml.). The reaction mixture temperature is raised to 55° C. and it is stirred at this temperature for an hour. On cooling to room temperature, a solution is obtained from which evaporation of the solvent produces a clear brown resin that softens above 370° C.

EXAMPLE 15

This example describes preparation of zinc/aluminum chelate polymers with varying Zn:Al ratios.

A series of solutions of 5.1 g. (0.014 mole) of methylenebis[2-(N-butylformimidoyl)phenol] in 70 ml. of dry pyridine is heated to 90° C. under a dry nitrogen atmosphere while diethyl zinc is added. The reaction mixture is then stirred at 90° C. for one hour and then tributyl aluminum, as a 25% solution in heptane, is introduced. The reaction is then stirred at reflux temperature for 1 hour, after which the resin solutions are cooled to room temperature. Removal of solvent from the resulting resins is effected by drying in a vacuum oven, with the oven temperature being slowly raised from room temperature to 180° C., while the pressure remains constant at about 10 mm. Hg under anhydrous conditions. A sample of the polymeric film deposited upon removal of solvent is transferred to a heated aluminum block for determination of the melting point.

In six preparations conducted as stated above, the total amount of organometallic added is equivalent to 0.014 mole of methylenebis[2-(N-butylformimidoyl) phenol], distributed between the dialkyl zinc, and the trialkyl aluminum, as shown in the following table, in which the softening points of the resulting polymers are stated.

| Mole ratio of Zn/Al: | Softening point of Polymer (° C.) |
|---|---|
| 20:1 | 180 |
| 10:1 | 195 |
| 7:1 | >370 |
| 5:1 | >370 |
| 1:1 | >370 |

EXAMPLE 16

This example describes plasticization of the present polymer.

A series of polymer preparations is conducted by adding 6.75 g. (0.054 mole) of diethyl zinc, as 33.8 ml. of a 25% solution of the diethyl zinc in heptane, to a solution of 20 g. (0.054 mole) of methylenebis[2-(N-butylformimidoyl)-phenol] in 300 ml. of anhydrous pyridine, stirred under a dry nitrogen atmosphere. After the addition is complete, the solution is stirred at 110° C. for an hour.

Now, 0.6 g. of ethylenediamine is aded to the reaction mixture, and the resulting mixture is stirred for an hour at 100° C. prior to removing the solvent.

The product is a resin which is infusible at 370° C.

To effect plasticization of the foregoing polymer, a polyphenyl ether mixture is used which is a mixture of 5-ring polyphenyl ethers wherein the non-terminal phenylene rings are linked through oxygen atoms in the meta-para positions and composed, by weight, of about 65% m-bis(m-phenoxyphenoxy)benzene, 30% m-[(m-phenoxyphenoxy)(p-phenoxyphenoxy)]benzene, and 5% m-bis(p-phenoxyphenoxy)benzene.

Weighed amounts of the above-described chelate polymers are placed in vessels in which they are mixed with weighed amounts of the above-described polyphenyl ether mixture, varying from 0.1% by weight of the polymer weight up to 20% by weight of the polymer.

In films cast from these mixtures, plasticizing effects are visually evident at 5.0 weight percent and higher concentrations of the polyphenyl ether, and at 10.0% and above, flexibility of the films as compared to the unplasticized resin is markedly enhanced. The softening point of the films including ten weight percent or more of the plasticizer, per weight of the polymer, is 210° C.

EXAMPLE 17

This example describes preparation of a laminate.

To prepare the resin, a solution of 146.6 g. (0.4 mole) of methylenebis[2 - (N-n-butylformimidoyl)phenol] and 40.84 g. (0.1 mole) of methylenebis[2-(N-3-pyridylformimidoyl(phenol] in 2 liters of anhydrous pyridine is heated to 100° C. under a nitrogen atmosphere with 61.7 g. (0.5 mole) of diethyl zinc. The reaction mixture is heated and stirred for one-half hour, and then about 300 ml. of the solvent is removed by distillation and the reaction mixture cooled to room temperature. Now, 9.3 g. of hexamethylenediamine dissolved in 50 ml. of pyridine is added and the mixture is stirred for an hour, providing the resin solution.

Twelve 8 x 8 inch pieces of style 181, A–1100 γ-aminopropyl silane finished glass fabric are dipped into this resin solution, the excess allowed to drip off, and the resin-coated fabric dried at 120° C. under vacuum for an hour. This dipping and drying procedure is repeated 5 times, and then the dry impregnated plies are placed on top of one another in a mold and heated under 85 p.s.i. pressure at 245° C. for 2 hours. After cooling to room temperature, the laminate is removed from the mold and thereafter dried at 200° C. for 12 hours. The product is a strong, slightly flexible, heat-stable coherent laminate which can be used as a material of construction.

EXAMPLE 18

This describes preparation of another laminate, using an ethylenediamine cross-linked resin.

Preparation of the resin is effected by reacting highly purified methylenebis[2 - (N - butylformimidoyl)phenol] with 1.04 moles of diethyl zinc per mole of the phenol in an anhydrous pyridine solvent. The resulting linear chelate polymer has a softening point of about 240° C. This polymer, in pyridine solution, is mixed with ethylenediamine in the amount of 2% of the weight of the methylenebis[2 - (N - butylformimidoyl)phenol] used in preparing the polymer. The resulting mixture is refluxed for 10 minutes, following which removal of volatiles comprising the pyridine solvent results in isolation of a soluble resin having a softening point above 400° C.

For laminate preparation, four-inch diameter circles of style 181, A–1100 γ-aminopropyl silane treated glass fabric are dipped in a 10% by weight solution of the resin in pyridine at room temperature. The excess is let drip off and the resin-coated fabric is dried in a vacuum oven at 120° C. for 2 hours. Repetition of this process another three times gives pieces with a resin content of 40–45% by weight of the total weight of resin and fabric. Ten layers of the impregnated fabric are then placed in a four-inch circular positive pressure mold, and heated at 65 p.s.i. and 200° C. for 2 hours. The resulting laminate is cooled to room temperature and removed from the mold, after which residual solvent is removed by heating at 200° C. under vacuum for twelve hours. The resulting laminate is a strong, rigid product adapted for use as a material of construction, especially for high temperature applications. At 400° C., the weight loss from the laminate in one hour is less than 10%, and most of this is lost in about the first half hour. Thereafter, the weight loss at the 400° C. temperature is less than one-half percent per hour.

EXAMPLE 19

This example describes preparation of still another laminate in accordance with this invention, which in this case contains trivalent metal in the polymer chain.

For preparation of the polymer, a solution of 40.0 g. (0.109 mole) of methylenebis[2-(N-butylformimidoyl)-phenol] in 500 ml. of dry pyridine is heated to 90° C. under a dry nitrogen atmosphere, while 6.57 g. (0.053 mole) of diethyl zinc is added. The reaction mixture is stirred at 90° C. for an hour, and then 1.8 g. (0.009 mole) of tributyl aluminum is added, as a 25% solution in heptane. The reaction mixture is stirred at reflux temperature for an hour, and then cooled to 90° C., and held at this temperature while 5.1 g. (0.042 mole) more of diethyl zinc is introduced. The resulting reaction mixture is stirred at 90° C. for an hour, then refluxed for another hour, and then cooled to room temperature. The product is a clear viscous solution of a clear brown resin which, when isolated under anhydrous conditions, has a softening point above 400° C.

For laminate preparation, a solution of the polymer, prepared as above described, in pyridine, in which the polymer provides 6% of the total weight of the solution is maintained at room temperature while six 7 x 9 inch rectangular pieces of style 181, A–1100 α-aminopropyl silane treated glass fabric are dipped in the solution. The excess resin is let run off, and the resin-coated fabric dried in a vacuum oven at 110° C. for about 20 minutes, during which pressure in the oven is reduced to less than 25 millimeters Hg. The coating and drying process is repeated until the pieces contain approximately 40% resin, by weight of the total of resin fabric. The impregnated fabric pieces are then cut to provide twelve 4½ by 6½ inch pieces, which are stacked so that the warp of the fabric is in the 4-inch direction. The assembly is wrapped loosely in aluminum foil and molded under 200 p.s.i. pressure for 20 minutes at 149° C., and then at 80° C. for 2 hours. The laminate is cooled under pressure to room temperature, removed from the mold, and trimmed to about 4 by 6 inches. The product is a coherent, strong, rather rigid body, having mechanical properties adapting it for use as a material of construction.

EXAMPLE 20

This example describes preparation of another polymer comprising a trivalent metal atom.

A solution of 18.3 g. (0.05 mole) of methylenebis-[2-(N-butylformimidoyl)phenol] in 150 ml. of ethanol is stirred at room temperature with 22.68 g. (0.14 mole) of ferric chloride for 3 hours. The reaction mixture is then filtered to remove all the insoluble materials, and the ethanol solvent removed by evaporation. Extraction of the resulting reaction solid with petroleum ether removes unreacted organic matter, after which the residual reaction mixture is extracted with ethanol, and the ethanol extract is evaporated to dryness, leaving tris[2-(N-butylformimidoyl) - 4 - (2-[N-butylformimidoyl]-4-hydroxybenzyl)phenolato]iron (III), of the formula

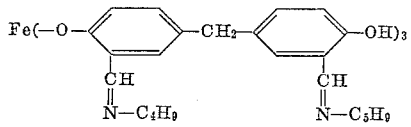

Preparation of polymer is now effected by adding 5.16 g. (0.05 mole) of diethyl zinc to a pyridine solution of methylenebis[2-(N-butylformimidoyl)phenol] (25.6 g., 0.07 mole), stirred and heated under an atmosphere of nitrogen. Heating is continued after the addition of the diethyl zinc is complete, and then the above-described ferric tris-chelate of methylenebis[2-(N-butylformimidoyl) phenol] is added to the reaction mixture, in an amount of 11.5 g. (0.01 mole), and heating is continued. Thereafter, a further 4.3 g. (0.035 mole) of diethyl zinc is introduced, and heating is again continued.

The resulting reaction mixture is a clear solution of high molecular weight, cross-linked polymeric chelate.

While the invention has been described with particular reference to specific preferred embodiments thereof, it is to be appreciated that modifications and variations can be made without departing from the scope of the invention, which is limited only as defined in the appended claims.

What is claimed is:

1. Chelated metal polymers characterized by repeating units of the formula

where X is a linking unit,

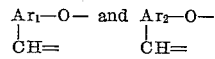

are o-hydroxyarylcarboxaldehyde residues and wherein $R_1$ and $R_2$ are aliphatic groups having at least 4 carbon atoms, $=NR_1$ and $=NR_2$ are mono-primary-amine residues and $M_{II}$ is a divalent tetracoordinated metal atom.

2. The polymers of claim 1, wherein said $M_{II}$ represents a zinc atom.

3. The polymers of claim 1, wherein said $M_{II}$ atom is zinc and said o-hydroxyarylcarboxaldehyde residues are salicylaldehyde residues.

4. The polymers of claim 1 wherein said $M_{II}$ atom is zinc, said o-hydroxyarylcarboxaldehyde residues are salicylaldehyde residues, and said mono-primary-amine residues are the residues of alkyl amines.

5. The polymers of claim 1, in which said mono-primary-amine residues include the residue of a mono-primary-amine in which the organic radical attached to the mono-primary-amine group includes a metal-coordinating group.

6. The polymers of claim 1 in which said mono-primary-amine residues include the residues of (1) a hydrocarbon mono-primary-amine and (2) the residue of a mono-primary-amine in which the organic radical attached to the primary amine group includes a metal coordinating group.

7. A chelated metal polymer characterized by repetitive units comprising units of the formula

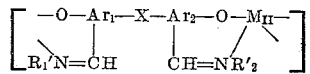

where each of $R'_1N=$ and $R'_2N=$ are separately selected from the residue of a mono-primary-amine and wherein each $R_1$ and $R_2$ of said mono-primary-amine is an aliphatic group having at least 4 carbon atoms and the residue of a di-primary-amine, provided that not more than one in 4 of each $R'_1N=$ and $R'_2N=$ radical is the residue of a di-primary-amine, X is a linking unit,

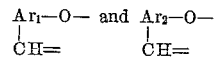

are o-hydroxyarylcarboxaldehyde residues, and $M_{II}$ is a divalent tetracoordinated metal atom.

8. The polymers of claim 7 wherein said di-primary-amine residues are the residues of an alkylene diamine.

9. A chelated metal polymer characterized by repetitive units comprising units of the formula

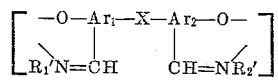

joined through metal atoms selected from divalent metal (II) atoms and trivalent metal (III) atoms in which the ratio of said divalent to said trivalent metal atoms is at least about 1:1, X is a linking unit,

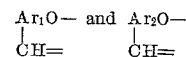

are o-hydroxyarylcarboxaldehyde residues, and each of $R'_1N=$ and $R'_2N=$ is separately selected from the class consisting of the residue of a mono-primary-amine and wherein each $R_1$ and $R_2$ of said mono-primary-amine is an aliphatic group having at least 4 carbon atoms and the residue of di-primary-amine, provided that not more than 1 in 4 of each $R'_1N=$ and $R'_2N=$ radical is the residue of a di-primary-amine.

10. The polymers of claim 9 wherein said trivalent metal (III) atoms are aluminum atoms.

11. The polymers of claim 9, wherein said divalent metal (II) atoms are zinc, said trivalent metal (III) atoms are aluminum, the ratio of said zinc to said aluminum atoms is above about 1 to 1, and said repetitive units joined through said metal atoms are methylene bis(2-[N-butylformimidoyl]phenyl) residues of the formula

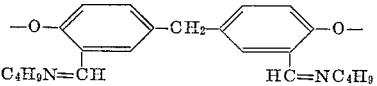

12. Chelated metal (II) polymer characterized by repeating units of the formula

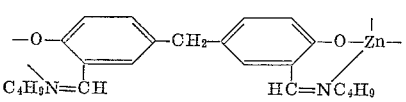

13. Chelated metal polymers consisting essentially of repetitive units of the formula

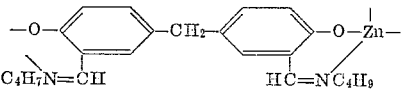

and of the formula

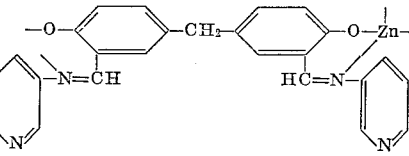

14. Chelated metal (II) polymers characterized by repetitive units comprising units (a) of the formula

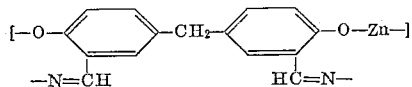

wherein the residual valences of the N atoms in said units are attached to substituents including (b) monovalent butyl and pyridyl radicals and (c) divalent hexamethylene radicals, provided that the ratio of said monovalent radicals to said divalent radicals is at least about 3 to 1.

15. The method of preparing a chelated metal polymer which comprises condensing together a linked bis-(o-hydroxyarylcarboxaldehyde), a mono-primary-amine, and an organometallic compound of a divalent, tetracoordinating metal.

16. The method of claim 15 wherein the Schiff base formed by condensation of the said linked bis o-hydroxyarylcarboxaldehyde and the said mono-primary-amine is condensed with the said organometallic compound of the divalent tetracoordinating metal.

17. The method of claim 16 in which said Schiff base which is the condensation product of a linked bis(o-hydroxyarylcarboxaldehyde) and a mono-primary-amine is condensed with a mixture of an organometallic compound of a divalent tetracoordinating metal and an organic compound of a trivalent hexacoordinating metal.

18. The method of providing a chelated metal polymer which comprises contacting a linked bis(o-formimidoylarenolato) chelated metal (II) polymer wherein the formimidoyl nitrogen atoms have monovalent substituents with a di-primary-amine, to replace up to about 1 in 4 of said monovalent substituents with divalent substituents.

19. The method of preparing a high-melting chelate polymer which is soluble in an organic solvent which comprises condensing together a linked bis(o-hydroxyarylcarboxaldehyde), a mono-primary-amine, and an organometallic compound of a divalent tetracoordinating metal, in a basic solvent medium.

20. The method of providing a high-melting soluble chelate polymer which comprises condensing together a linked bis(o-hydroxyarylcarboxaldehyde), a mono-primary-amine, and an organometallic compound of a divalent tetracoordinated metal, in a solvent medium comprising a heterocyclic tertiary amine.

21. The method of providing a chelated metal (II) polymer which is high melting but soluble, which comprises condensing the Schiff base of a mono-primary-amine with a methylenedisalicylaldehyde, and a dialkyl zinc, in pyridine.

22. In an article of manufacture comprising a plurality of sheets of glass fabric bonded together by a polymeric material the improvement wherein said polymeric material comprises a chelated metal polymer characterized by repeating units of the formula

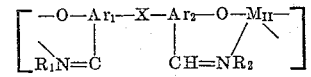

where X is a linking unit,

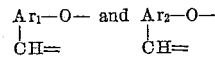

are o-hydroxyarylcarboxaldehyde residues, $=NR_1$ and $=NR_2$ are mono-primary-amine residues and $M_{II}$ is a divalent tetracoordinated metal atom.

References Cited

UNITED STATES PATENTS 3,023,161  2/1962  Luvisi _____ 260—47

OTHER REFERENCES

Skow, N. A.: Laminating, in Modern Plastics Encyc., issue September 1955, pp. 382–386.

Marvel et al.: J. Am. Chem. Soc., vol. 79, pp. 6,000–6,003, November 1957, QD 1A5.

Marvel: J. Am. Chem. Soc., vol. 81, pp. 2668–70, June 1959, QD 1A5.

WILLIAM H. SHORT, *Primary Examiner.*

SAMUEL H. BLECH, *Examiner.*

J. C. MARTIN, M. GOLDSTEIN, *Assistant Examiner.*